(12) United States Patent  (10) Patent No.: US 7,823,893 B2
Meyers et al.  (45) Date of Patent: Nov. 2, 2010

(54) HAND TRUCK WITH ADJUSTABLE-HEIGHT AUXILIARY CARRIER

(75) Inventors: Paul F. Meyers, Fishers, IN (US); Thomas J. Meyers, Greenwood, IN (US)

(73) Assignee: Cosco Management, Inc., Wilmington, DE (US)

( * ) Notice: Subject to any disclaimer, the term of this patent is extended or adjusted under 35 U.S.C. 154(b) by 65 days.

(21) Appl. No.: 12/034,519

(22) Filed: Feb. 20, 2008

(65) Prior Publication Data

US 2008/0203688 A1  Aug. 28, 2008

Related U.S. Application Data

(60) Provisional application No. 60/891,366, filed on Feb. 23, 2007.

(51) Int. Cl.
 *B62B 1/04* (2006.01)
(52) U.S. Cl. .................. 280/47.29; 280/47.18
(58) Field of Classification Search .............. 280/47.18, 280/47.19, 47.23, 47.27, 47.28, 47.29, 79.3; 211/90.02
 See application file for complete search history.

(56) References Cited

U.S. PATENT DOCUMENTS

| | | | | |
|---|---|---|---|---|
| 845,917 | A * | 3/1907 | Thomas et al. ........... | 211/90.02 |
| 1,424,819 | A | 8/1922 | Hayes et al. | |
| 2,598,489 | A * | 5/1952 | Bayer et al. ................. | 414/467 |
| 2,981,374 | A * | 4/1961 | Holsclaw .................... | 187/231 |
| 3,052,323 | A * | 9/1962 | Hopfeld ...................... | 187/232 |
| 3,052,484 | A | 9/1962 | Huffman et al. | |
| 3,179,270 | A | 4/1965 | Taragos | |
| 3,690,488 | A | 9/1972 | Cave | |
| 3,734,526 | A | 5/1973 | Propst | |
| 3,804,432 | A | 4/1974 | Lehrman | |
| 3,876,039 | A * | 4/1975 | Bushnell, Jr. ............... | 187/226 |
| 3,951,286 | A * | 4/1976 | Horst ......................... | 414/444 |
| 5,626,352 | A | 5/1977 | Grace | |
| 4,355,818 | A | 10/1982 | Watts | |
| 4,363,496 | A | 12/1982 | Schreiner | |
| 4,421,209 | A * | 12/1983 | Vermette et al. ............ | 187/235 |
| 4,448,434 | A | 5/1984 | Anderson | |
| 4,526,399 | A | 7/1985 | Holtz | |
| 4,537,421 | A | 8/1985 | Teachout | |
| 5,160,154 | A | 11/1992 | Seydel et al. | |
| 5,203,815 | A | 4/1993 | Miller | |
| D340,339 | S | 10/1993 | Kean et al. | |
| 5,251,922 | A * | 10/1993 | Mann ....................... | 280/47.29 |
| 5,365,860 | A * | 11/1994 | Billington, III ............. | 108/108 |
| 5,464,104 | A | 11/1995 | McArthur | |
| D373,669 | S | 9/1996 | Perkins | |
| 5,564,346 | A * | 10/1996 | Robben ..................... | 108/108 |
| 5,575,605 | A * | 11/1996 | Fisher ........................ | 414/490 |
| 5,595,395 | A | 1/1997 | Wilson | |
| 5,644,993 | A * | 7/1997 | Dohnalik .................... | 108/108 |
| 5,678,842 | A | 10/1997 | Hook et al. | |
| 5,697,624 | A | 12/1997 | Faraj | |
| D396,923 | S | 8/1998 | Moore | |
| D399,625 | S | 10/1998 | Murphy et al. | |
| 5,845,915 | A | 12/1998 | Wilson | |

(Continued)

*Primary Examiner*—Jeffrey J Restifo
(74) *Attorney, Agent, or Firm*—Barnes & Thornburg LLP

(57) ABSTRACT

A hand truck includes a base and a toe-plate shelf coupled to the base. The base includes a truck frame and a wheel unit coupled to the truck frame.

18 Claims, 6 Drawing Sheets

U.S. PATENT DOCUMENTS

| | | | |
|---|---|---|---|
| 5,863,055 A | 1/1999 | Kasravi et al. | |
| 5,885,047 A * | 3/1999 | Davis et al. | 414/490 |
| 6,131,926 A | 10/2000 | Harlan | |
| 6,131,927 A | 10/2000 | Krawczyk | |
| 6,135,466 A | 10/2000 | Irwin | |
| D440,372 S | 4/2001 | Williams | |
| 6,309,168 B1 * | 10/2001 | Holmes | 414/490 |
| 6,457,727 B1 * | 10/2002 | Tolly | 280/47.28 |
| 6,530,740 B2 * | 3/2003 | Kim | 414/490 |
| 6,659,476 B2 | 12/2003 | Weida | |
| 6,709,222 B2 | 3/2004 | Inman | |
| D502,304 S | 2/2005 | Leach | |
| 6,880,851 B1 | 4/2005 | Summers et al. | |
| 6,921,095 B2 * | 7/2005 | Middleby | 280/47.29 |
| 6,929,269 B2 | 8/2005 | Oliver | |
| 6,971,654 B2 * | 12/2005 | Amsili | 280/47.2 |
| 7,213,816 B2 * | 5/2007 | Gregory et al. | 280/33.996 |
| 7,320,472 B2 * | 1/2008 | Gregory et al. | 280/79.3 |
| 2004/0124598 A1 | 7/2004 | Williams | |
| 2005/0110232 A1 * | 5/2005 | DiBenedetto | 280/47.29 |
| 2008/0203688 A1 * | 8/2008 | Meyers et al. | 280/47.29 |

* cited by examiner

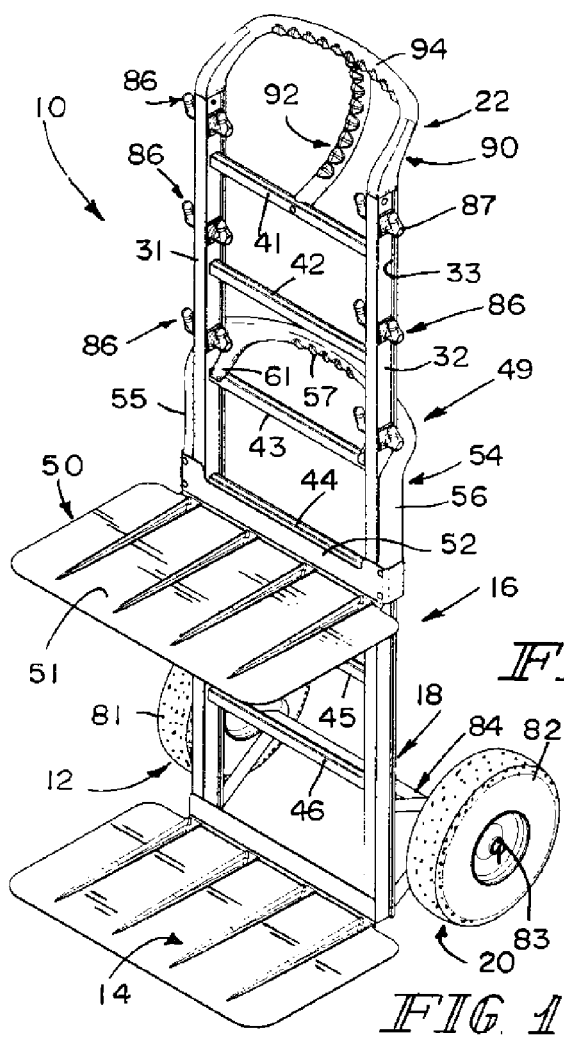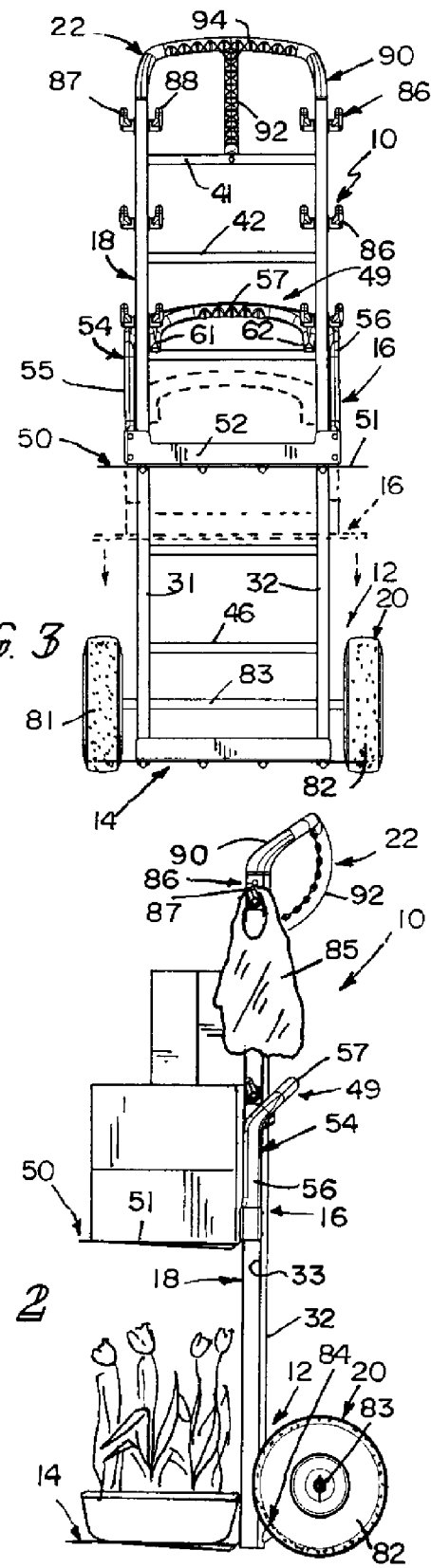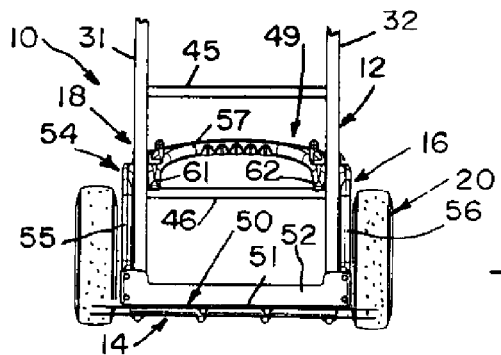

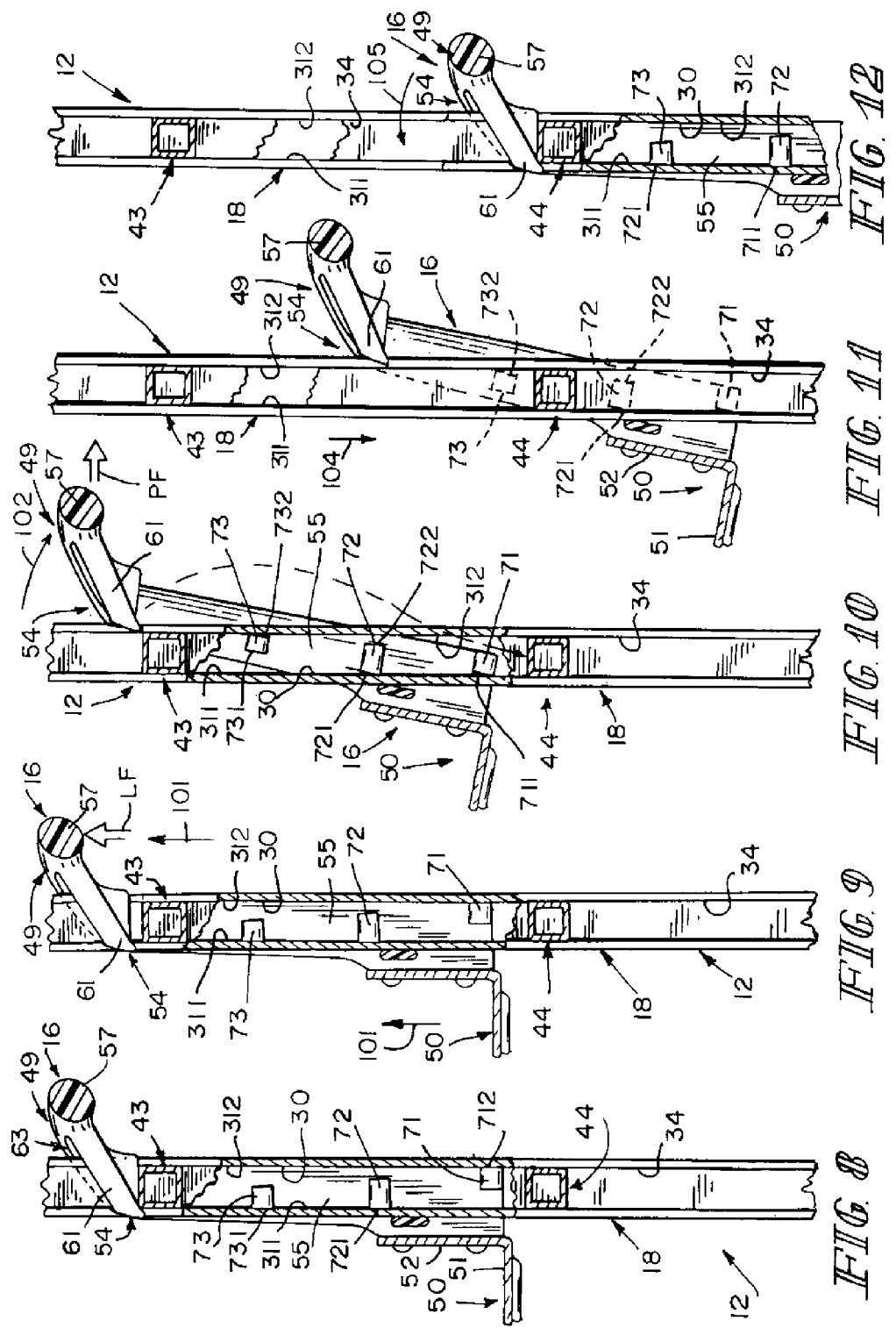

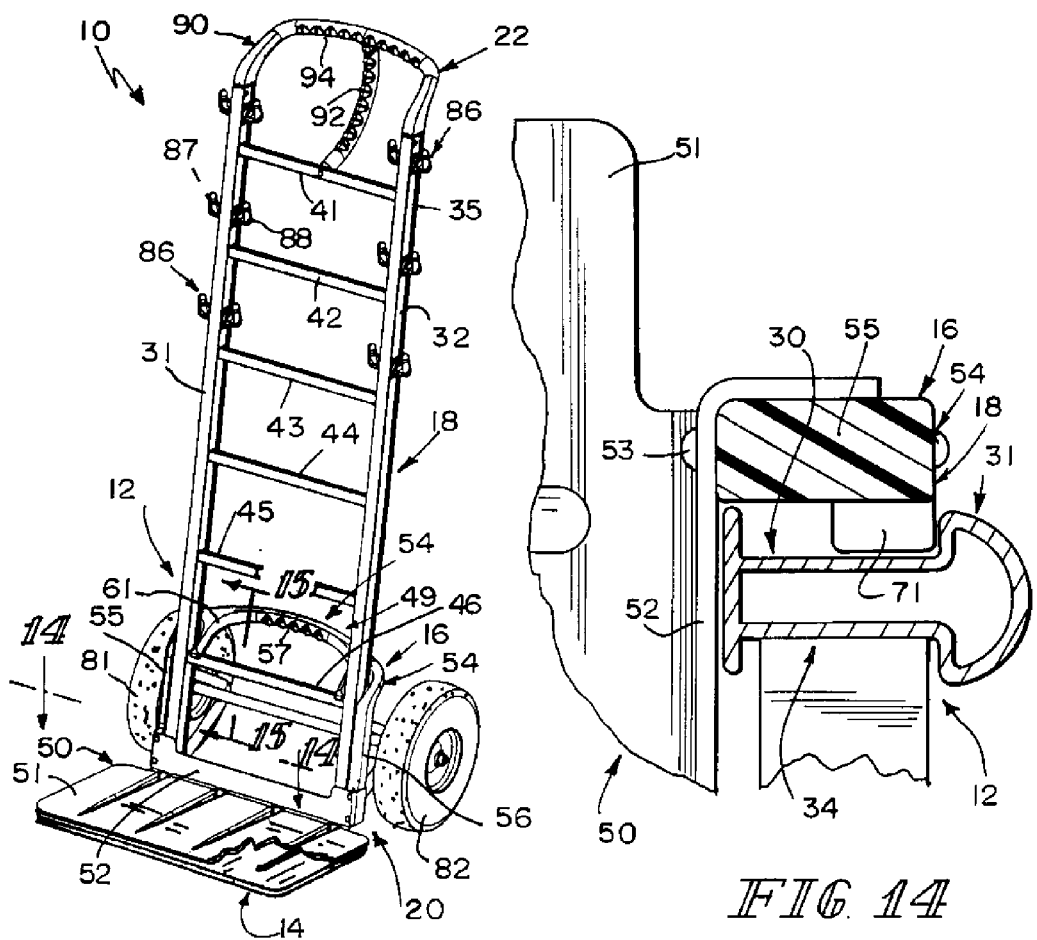
FIG. 13
FIG. 14
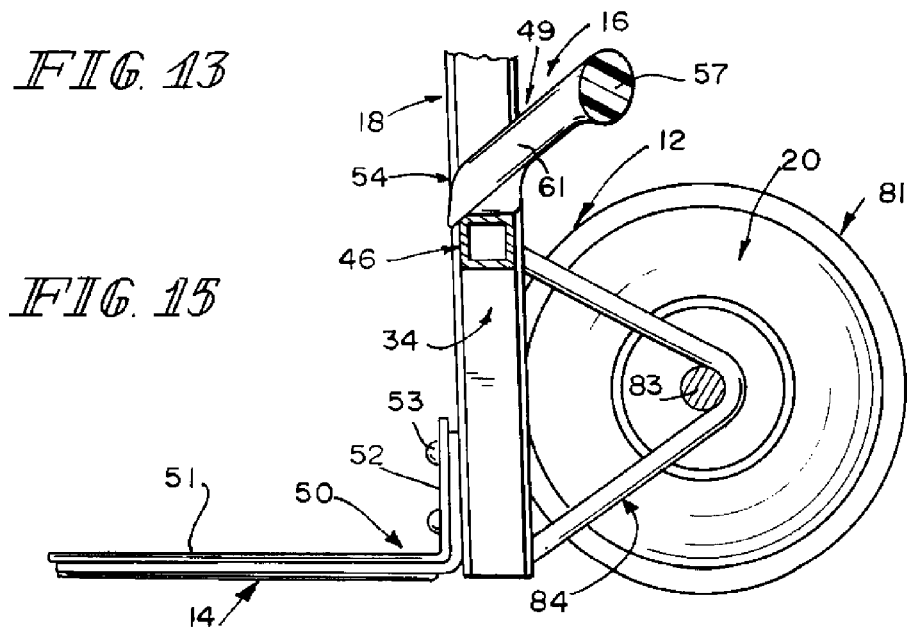
FIG. 15

HAND TRUCK WITH ADJUSTABLE-HEIGHT AUXILIARY CARRIER

This application claims priority under 35 U.S.C. §119(e) to U.S. Provisional Application No. 60/891,366 filed Feb. 23, 2007, which is expressly incorporated by reference herein.

BACKGROUND

The present disclosure relates to carriers, and particularly to hand trucks. More particularly, the present disclosure relates to a rolling hand truck having a toe-plate shelf.

SUMMARY

A hand truck in accordance with the present disclosure includes a base, a toe-plate shelf coupled to the base, and an auxiliary carrier mounted on the base for movement relative to the toe-plate shelf. The auxiliary carrier includes a movable shelf.

In illustrative embodiments, the auxiliary carrier also includes a shelf position changer configured to provide means for changing the position of the movable shelf on the base so as to vary the height or elevation of the movable shelf relative to the underlying toe-plate shelf. The shelf position changer includes a shelf mover and an anchor coupled to the shelf mover.

The movable shelf is coupled to the mover shelf to move up and down with the shelf mover on the base and relative to the underlying toe-plate shelf. The anchor is configured to mate with the base to limit movement of the shelf mover and movable shelf relative to the base. In illustrative embodiments, the shelf mover includes a first side leg coupled to one side of the movable shelf, a second side leg coupled to another side of the movable shelf, and a crossbar coupled to both side legs and configured to provide a handgrip.

In illustrative embodiments, the shelf position changer also includes anchor means coupled to the shelf mover for engaging the base to retain the shelf mover and movable shelf in a fixed position relative to the base. In illustrative embodiments, the anchor means includes first and second anchors coupled to the crossbar of the shelf mover and configured to form hooks sized to mate with horizontal rungs included in the base.

A delivery person using the hand truck can operate the shelf mover to move the attached movable shelf from a lowest position resting on the underlying toe-plate shelf to a raised position elevated above the toe-plate shelf. In such a configuration, two separate shelves are available on the base to carry goods. When two separate shelves are no longer needed, the delivery person can use the shelf mover to lower the movable shelf to the lowest position resting on (or just above) the toe-plate shelf to provide, in effect, only one rigid shelf made of the mating (or nearly mating) movable and toe-plate shelves.

Additional features of the present disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a hand truck in accordance with the present disclosure showing a toe-plate shelf coupled to a lower end of a truck frame included in a rolling base and an auxiliary carrier including a shelf position changer mounted for up-and-down movement on the truck frame and a movable shelf coupled to the shelf position changer for movement therewith and located in an elevated position above the underlying toe-plate shelf;

FIG. 2 is a side elevation view of the hand truck of FIG. 1 after a tray of flowers has been placed on the toe-plate shelf and several packages have been placed on the elevated movable shelf and after a bag has been hung on one of the hooks coupled to an upper end of the truck frame;

FIG. 3 is a front elevation view of the hand truck of FIG. 1 showing the auxiliary carrier in a raised position (in solid) and in motion (in phantom) as the auxiliary carrier is moved downwardly toward the stationary underlying toe-plate shelf;

FIG. 4 is a partial front elevation view of the hand truck of FIG. 1 showing the auxiliary carrier in a lowered position on the truck frame to place the movable shelf on or at least in close proximity to the stationary underlying stationary toe-plate shelf to establish, in effect, only one rigid shelf made of the movable and toe-plate shelves;

FIGS. 8-12 show movement of the auxiliary carrier (e.g., movable shelf and shelf position changer) relative to the truck frame from a raised position shown in FIG. 1 to an intermediate position located between the raised position shown in FIG. 1 and the lowered position shown in FIG. 4;

FIG. 8 is a partial sectional view taken along line 8-8 of FIG. 7, with portions of a first upright rail broken away to show location of an upper guide block, a middle pivot block, and a lower guide block in the channel formed in the upright rail while a first anchor mates with a first horizontal rung in the truck frame to retain the auxiliary carrier in a raised position on the truck frame;

FIG. 9 is a view similar to FIG. 8 showing upward movement of the auxiliary changer relative to the truck frame to disengage the first anchor from the first horizontal rung;

FIG. 10 is a view similar to FIGS. 8 and 9 showing pivoting movement of the auxiliary changer relative to the truck frame in a clockwise direction about a fulcrum established by the middle pivot block to move the first anchor in a rearward direction clear of the first horizontal rung to free the auxiliary carrier for up-and-down movement on the truck frame;

FIG. 11 is a view similar to FIGS. 8-10 showing downward movement of the auxiliary carrier on the truck frame away from the first horizontal rung;

FIG. 12 is a view similar to FIGS. 8-11 showing mating engagement of the first anchor with a second horizontal rung arranged to underlie the first horizontal rung to retain the auxiliary carrier in a new and lower-elevation position on the truck frame;

FIG. 13 is a perspective view similar to FIG. 1 showing the auxiliary carrier in the lowest position shown in FIG. 4;

FIG. 14 is an enlarged partial sectional view taken along line 14-14 of FIG. 13 showing placement of the lower guide block in the channel formed in the first upright rail; and FIG. 15 is an enlarged partial sectional view taken along line 15-15 of FIG. 14 showing the movable shelf of the auxiliary carrier at rest on the stationary underlying toe-plate shelf coupled to a lower end of the truck frame to establish, in effect, only one rigid shelf made of the movable and toe-plate shelf.

DETAILED DESCRIPTION

Figure 5:
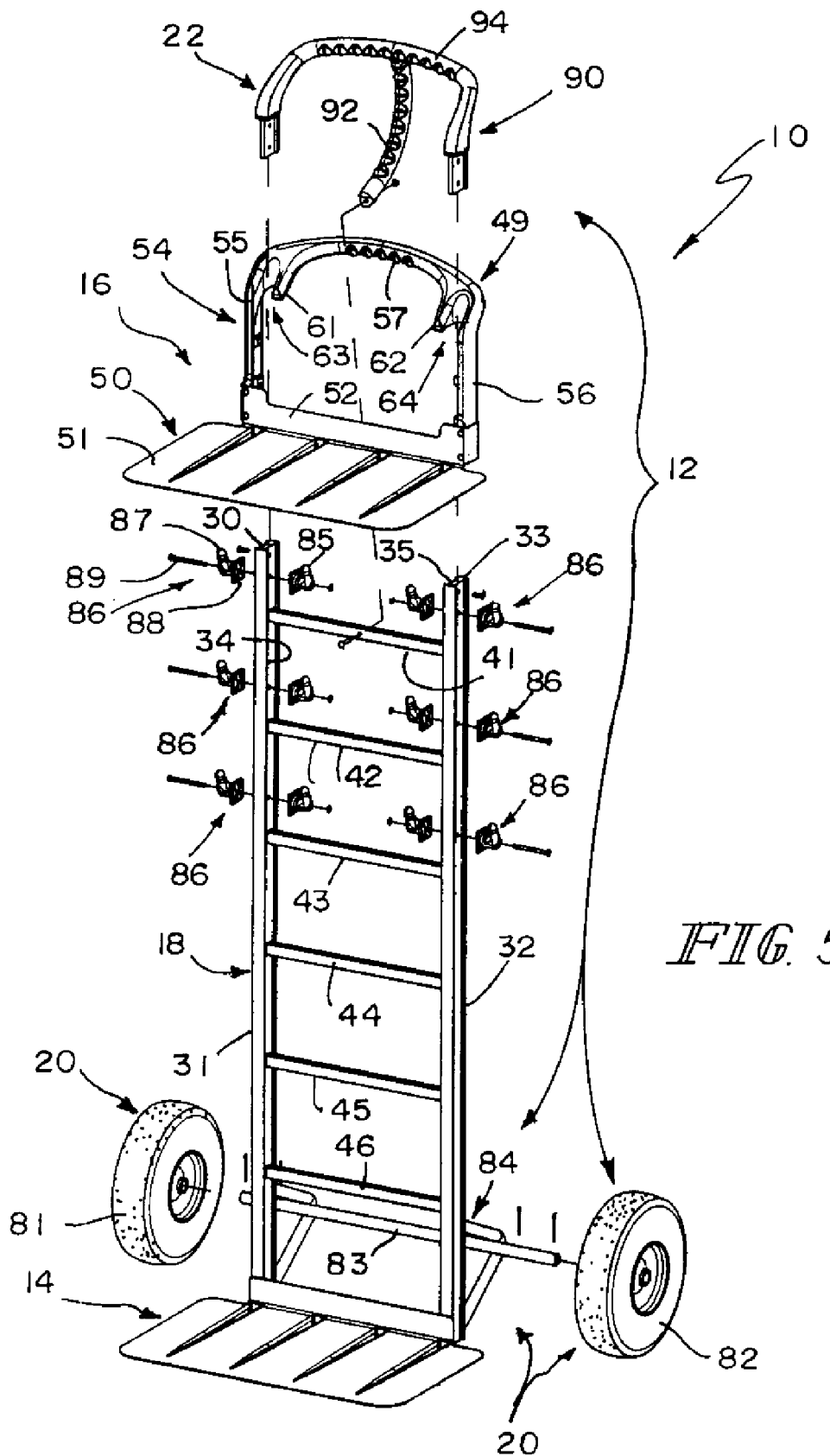
FIG. 5 is an exploded perspective assembly view of components included in the hand truck of FIGS. 1-4 showing (from top to bottom) a frame handle, the auxiliary carrier including a movable shelf and a shelf position changer coupled to the movable shelf, the truck frame, six bag-hanger hooks adapted to be mounted on the truck frame, a wheel unit adapted to be mounted on a lower end of the truck frame, and the stationary toe-plate shelf fixed to the lower end of the truck frame and showing that the shelf position changer of the auxiliary carrier includes a somewhat U-shaped shelf mover adapted to mate with and slide up and down on upright rails included in the truck frame and a pair of spaced-apart downwardly extending anchors coupled to a crossbar included in the U-shaped shelf mover and adapted to mate with each of the horizontal rungs coupled to the upright rails in the truck frame to establish the elevation of the movable shelf (and shelf mover) relative to the stationary underlying toe-plate shelf.

A hand truck 10 includes a base 12, a toe-plate shelf 14 coupled to base 12, and an auxiliary carrier 16 located above toe-plate shelf 14 as shown, for example, in FIGS. 1 and 2. Auxiliary carrier 16 includes a movable shelf 50 and is mounted for up-and-down movement on base 12 relative to the underlying toe-plate shelf 14 as suggested in FIGS. 3 and 4. When auxiliary carrier 16 is not needed to provide a second shelf on base 12 in addition to toe-plate shelf 14, auxiliary carrier 16 is moved to a lowest position on base 12 as shown, for example, in FIGS. 4, 13, and 15 to cause movable shelf 50 to rest on (or perhaps just above) the underlying toe-plate shelf 14. Illustrative movement of auxiliary carrier 16 between raised and lowered positions on base 12 is shown, for example, in FIGS. 8-12.

In the illustrated embodiment, auxiliary carrier 16 includes a movable shelf 50 and a shelf position changer 49 coupled to movable shelf 50 and mounted for up-and-down movement on base 12 as suggested in FIGS. 1-4. Shelf position changer 49 illustratively includes a shelf mover 54 and a pair of anchors 61, 62 coupled to shelf mover 54 as suggested in FIGS. 1-3 and 5.

In an illustrative embodiment, base 12 includes a truck frame 18, a wheel unit 20 coupled to a lower end of truck frame 18, and a handle 22 coupled to an upper end of truck frame 18 as suggested, for example, in FIGS. 1 and 5. Toe-plate shelf 14 is fixed, for example, in a stationary position relative to truck frame 18 in the illustrated embodiment. In an illustrative embodiment, auxiliary carrier 16 is mounted for reciprocating, sliding, and pivoting movement on truck frame 18 as shown, for example, in FIGS. 8-12 to allow a user to vary the elevation of movable shelf 50 on rolling base 12 relative to underlying toe-plate shelf 14.

Truck frame 18 includes first and second upright rails 31, 32 and six horizontal rungs 41, 42, 43, 44, 45, and 46 as shown, for example, in FIG. 5. First and second upright rails 31, 32 are arranged to lie in spaced-apart parallel relation to one another as suggested in FIG. 3. Each rung 41-46 is arranged to lie between first and second upright rails 31, 32 and is coupled to each of first and second upright rails 31, 32 as suggested in FIG. 5. In an illustrative embodiment, auxiliary carrier 16 is mounted for movement on first and second upright rails 31, 32 of truck frame 18 as suggested in FIGS. 3 and 8-12.

First upright rail 31 is formed to include an outer channel 30 and second upright rail 32 is formed to include an outer channel 33 as suggested in FIGS. 5-8. Outer channels 30, 33 are arranged to open outwardly in opposite directions as suggested in FIG. 5 and to receive therein portions of auxiliary carrier 16 as suggested in FIGS. 6, 7, and 8-12. In an illustrative embodiment, first rail 31 is also formed to include an inner channel 34 receiving one end of each rung 41-46 and second rail 32 is also formed to include an inner channel 35 receiving one end of each rung 41-46 as suggested in FIG. 5.

Figure 6:
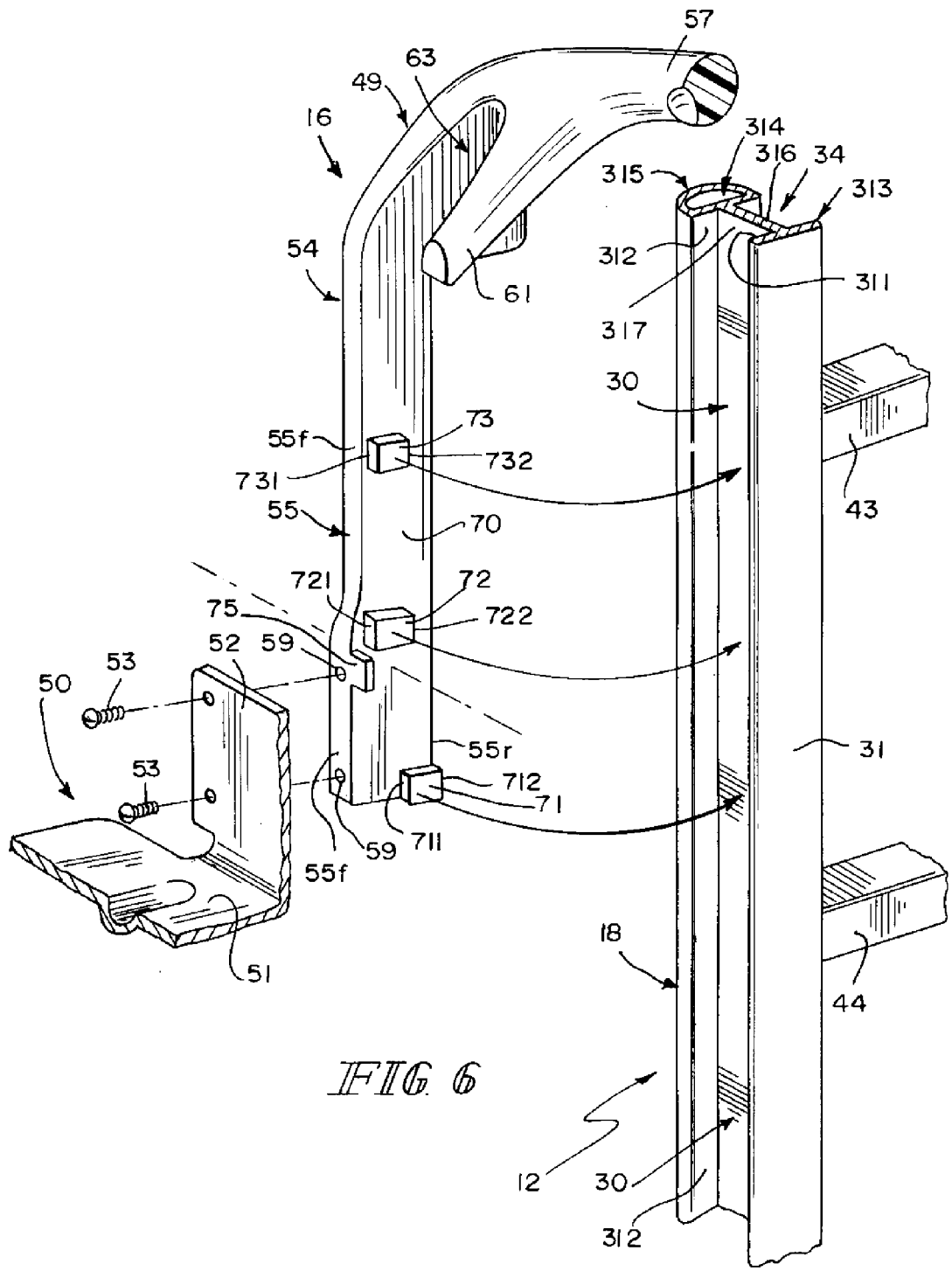
FIG. 6 is an enlarged exploded assembly view of portions of the truck frame and auxiliary carrier of FIGS. 1-5 showing use of fasteners to couple a portion of the movable shelf to a first side leg included in the U-shaped shelf mover and adapted to slide up and down in a channel formed in one of the upright rails included in the truck frame, three blocks coupled to the first side leg and sized to fit into the channel when the U-shaped shelf mover is mounted for sliding movement on the truck frame, and one of the anchors adapted to mate with a horizontal rung included in the truck frame.
Figure 7:
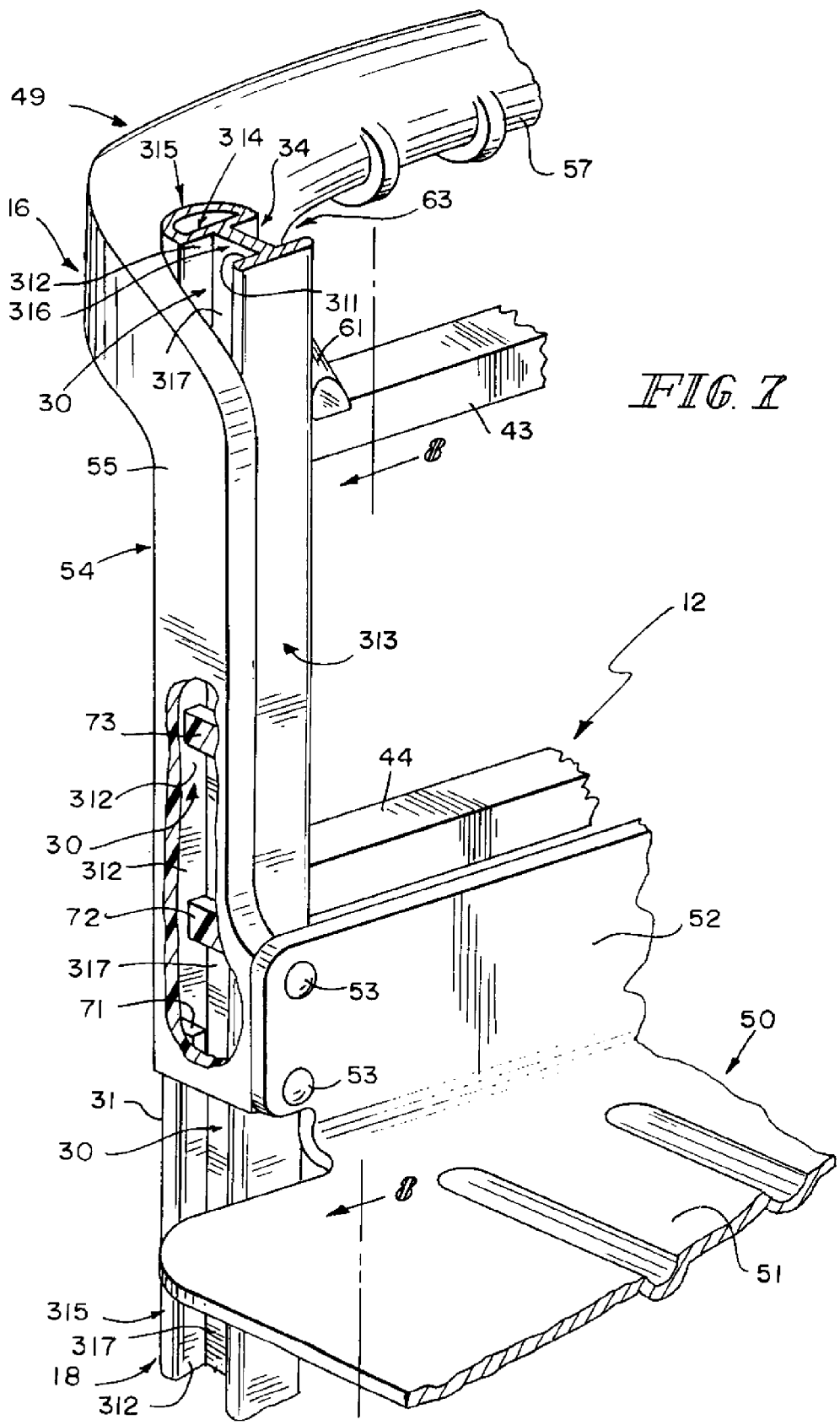
FIG. 7 is a partial perspective view similar to FIG. 6, with portions broken away, showing the auxiliary carrier in a fixed position on the truck frame owing, in part, to mating engagement of the anchor with one of the rungs included in the truck frame and placement of the three blocks on the first side leg in the channel formed in a companion upright rail included in the truck frame.

In an illustrative embodiment, first upright rail 31 of truck frame 18 includes a front plate 313, a rear plate 314 arranged to lie in spaced-apart parallel relation to front plate 313, and a rigidifying shell 315 coupled to rear plate 314 to locate rear plate 314 between rigidifying shell 315 and front plate 313 as shown in FIG. 6. First upright rail 31 also includes a bridge 316 arranged to interconnect front and rear plates 313, 314 and separate outer and inner channels 30, 34 as suggested in FIG. 6. Second upright rail 32 has a construction similar to first upright rail 31 as suggested in FIG. 5.

Auxiliary carrier 16 includes a movable shelf 50 and a shelf position changer 49 including shelf mover 54 and anchors 61, 62 as shown, for example, in FIG. 5. Shelf position changer 49 is configured to provide means for moving movable shelf 50 up and down on truck frame 18 relative to underlying toe-plate shelf 14 and for anchoring movable shelf 50 to truck frame 18 at any of several predetermined points on truck frame 18 to set the elevation of movable shelf 50 on truck frame 18 relative to the underlying toe-plate shelf 14 as suggested in FIGS. 3 and 8-12. In use, shelf position changer 49 can be used to anchor movable shelf 50 on truck frame 18 in a raised position as shown, for example, in FIGS. 1-3 or in a lowest position resting on an upwardly facing surface of toe-plate shelf 14 as shown, for example, in FIGS. 4, 14, and 15.

Movable shelf 50 includes a horizontal shelf plate 51 and a vertical shelf mount 52 coupled to a rear portion of shelf plate 51 as suggested in FIG. 5. Fasteners 53 are used to fasten shelf mount 52 to shelf mover 54 to form a portion of shelf position changer 49 as suggested in FIGS. 5, 6, and 7.

A shelf mover 54 is included in shelf position changer 49 and is somewhat U-shaped in the illustrated embodiment as shown in FIG. 5. Shelf mover 54 includes a first side leg 55 associated with first upright rail 31 of truck frame 18, a second side leg 56 associated with second upright rail 32 of truck frame 18, and a crossbar or handle 57 coupled at one end to a top end of first side leg 55 and at an opposite end to a top end of second side leg 56 as suggested, for example, in FIGS. 5 and 6.

Shelf position changer 49 also includes first and second anchors 61, 62 configured to provide anchor means for engaging any of rungs 41-46 included in hand truck 18 to establish the elevation of movable shelf 50 of auxiliary carrier 16 relative to the underlying toe-plate shelf 14. As suggested in FIG. 5, each of first and second anchors 61, 62 are coupled to crossbar 57 of shelf mover 54 and arranged to extend downwardly toward toe-plate shelf 14 to provide hooks configured to mate and unmate from rungs 41-46 during movement of auxiliary carrier 16 relative to truck frame 18 as suggested, for example, in FIGS. 8-12. In an illustrative embodiment shown in FIGS. 3 and 5, first and second anchors 61, 62 are arranged to lie in spaced-apart relation to one another along the length of crossbar 57, first anchor 61 is arranged to lie in close proximity to first side leg 55 to define a rail-receiving space 63 therebetween receiving first upright rail 31 therein, and second anchor 62 is arranged to lie in close proximity to second side leg to define a rail-receiving space 64 therebetween receiving second upright rail 32 therein.

As suggested in FIG. 6, three blocks 71, 72, 73 are also included in shelf mover 54 and associated with and coupled to first side leg 55. Similarly, three other blocks (not shown) are also included in shelf mover 54 and associated with and coupled to second side leg 56. These blocks 71-73 are coupled to an inwardly facing surface 70 of first side leg 55 and arranged to extend into and move in outer channel 30 formed in first upright rail 31 during movement of auxiliary carrier 16 relative to truck frame 18 of base 12 to provide guide means for guiding shelf mover 54 relative to truck frame 18 as a user lifts, pivots, and lowers (or raises) shelf mover 54 of shelf position changer 49 to change the elevation of movable shelf 50 relative to the underlying toe-plate shelf 14. The other three blocks (not shown) are coupled on an inwardly facing surface of second side leg 32 and arranged to extend into outer channel 34 formed in second upright rail 32 to cooperate with blocks 71-73 to define the guide means.

In an illustrative embodiment shown, for example, in FIG. 6, a lower guide block 71 is coupled to a lowermost end of first side leg 55, an upper guide block 73 is coupled to a middle portion of first side leg 55 located midway between the lowermost end and crossbar 57, and a middle pivot block 72 is coupled to the first side leg 55 and located midway between lower and upper guide blocks 71, 73. In illustrative embodiments, middle pivot block, 72 is larger in size than each of lower and upper guide blocks 71, 73 as suggested in FIG. 6. Also, lower guide block 71 is located alongside a rear edge 55*r* of first side leg 55 and upper guide block 73 is located alongside a front edge 55*f* of first side leg 55. A mount flange 75 is cantilevered to front edge 55*f* of first side leg 55 to mate with shelf mount 52 of movable shelf 50 when shelf mount 52 is coupled to first side leg 55 using fasteners 53 extending into apertures 50 formed in first side leg 55 to rigidify movable shelf 50 on shelf mover 54 as suggested in FIG. 6.

Wheel unit 20 of base 12 includes first and second wheels 81, 82 coupled to an axle 83. Axle 83 is coupled in a suitable manner to an axle mount 84 coupled to a lower end of truck frame 18 as suggested in FIG. 15.

Handle 22 includes a U-shaped handle frame 90 having one end coupled to a top end of first upright rail 31 and another end coupled to a top end of second upright rail 32 as suggested in FIGS. 1 and 5. Handle 22 also includes a curved grip 92 having a lower end coupled to first rung 41 and an upper end coupled to a crossbar 94 included in U-shaped handle frame 90 as suggested in FIGS. 1 and 5.

Six bag-hanger units 86 are adapted to be coupled to hand truck 18 as suggested in FIGS. 1, 3, and 5. Each bag-hanger unit 86 includes a hook 87, a hook mount 88, and a fastener 89 configured to fasten hook 87 and hook mount 88 to one of first and second upright rails 31, 32 included in hand truck 18 as suggested in FIG. 5. A bag 85 or other suitable item can be hung on one of hooks 87 as suggested in FIG. 2.

In use, as suggested in FIGS. 8-12, a user (not shown) can apply a lifting force LF to crossbar 57 to move auxiliary carrier 16 and its movable shelf 50 upwardly in direction 101 relative to hand truck 18 from a first position shown in FIG. 8 to a second position shown in FIG. 9. This upward movement unmates first and second anchors 61 and 62 from rung 43 as shown in FIG. 9. During this upward movement, as suggested in FIGS. 6, 8, and 9, a first working surface 731 of upper guide block 73 confronts and mates with a first guide surface 311 of first upright rail 31, a first working surface 721 of middle pivot block 72 confronts and mates with first guide surface 312, and a second working surface 712 of lower guide block 71 confronts and mates with a second guide surface 312 of first upright rail 31.

Next, the user applies a pulling force PF to crossbar 57 of shelf mover 54 to move auxiliary carrier 16 and its movable shelf 50 in a rearward-and-downward clockwise direction 102 to assume a third position as suggested in FIG. 10. This movement causes shelf mover 54 of shelf position changer 49 to pivot relative to hand truck 18 about a fulcrum established by engagement of first working surface 721 of middle pivot block 72 and first guide surface 311 of first upright rail 31. Pivoting movement of shelf mover 54 in pivoting direction 102 is blocked by engagement of a second working surface 732 of upper guide block 73 and second guide surface 312 of first upright rail 31 as shown, for example, in FIG. 10.

Once pivoted, shelf mover 54 of shelf position changer 49 can be lowered in downward direction 104 as suggested in FIGS. 10 and 11 to lower movable shelf 50 toward the underlying toe-plate shelf 14. As shelf mover 54 is being lowered, as suggested in FIGS. 10 and 11, second working surface 732 of upper guide block 73 confronts and mates with a second guide surface 312 of first upright rail 31, a second working surface 722 of middle pivot block 72 confronts and mates with second guide surface 312 while first working surface 721 of middle pivot block 72 confronts and mates with first guide surface 311, and a first working surface 711 of lower guide block 71 confronts and mates with first guide surface 311 of first upright rail 31.

Finally, the user applies a returning force RF to crossbar 57 of shelf mover 54 to move auxiliary carrier 16 and its movable shelf 50 in a forward-and-upward counterclockwise inward direction 105 as suggested in FIG. 12. This movement causes first and second anchors 61, 62 of shelf position changer 49 to mate with horizontal rung 44 of hand truck 18 to retain auxiliary carrier 16 and its movable shelf 50 in a new and lower-elevation position on hand truck 18 of base 12 as shown in FIG. 12. These steps can be reversed to raise auxiliary carrier 16 and its movable shelf 50 to a higher-elevation position on hand truck 18 of base 12.

The invention claimed is:

1. A hand truck comprising
a rolling base,
a toe-plate shelf coupled to the rolling base,
an auxiliary carrier including a movable shelf arranged to lie above the toe-plate shelf and a shelf position changer means for changing the position of the movable shelf on the rolling base relative to the toe-plate shelf underlying the movable shelf to vary the elevation of the movable shelf above the toe-plate shelf,
wherein the shelf position changer includes a shelf mover mounted for up-and-down movement on the rolling base and the movable shelf is coupled to the shelf mover to move therewith between a lowered position near the toe-plate shelf and a raised position elevated above the toe-plate shelf,
wherein the rolling base includes a truck frame and a wheel unit coupled to the truck frame, the truck frame includes first and second upright rails arranged to lie in spaced-apart relation to one another and rungs arranged to interconnect the first and second upright rails, and the shelf mover includes a first side leg mounted for sliding movement on the first upright rail, a second side leg mounted for sliding movement on the second upright rail, and a crossbar interconnecting the first and second side legs, and the movable shelf is coupled to the first and second side legs to move therewith, and wherein the first upright rail is formed to include an outer channel, the first side leg of the shelf mover includes an inwardly facing surface facing toward the outer channel, and the shelf mover further includes first, second, and third blocks coupled to the inwardly facing surface of the first side leg and arranged to extend into and move in the outer channel during up-and-down movement of the shelf mover on the rolling base to provide guide means for guiding the shelf mover relative to the truck frame as a user lifts, pivots, lowers, and raises the shelf mover to change elevation of movable shelf relative to the toe-plate shelf.

2. The hand truck of claim 1, wherein the movable shelf is arranged to mate with the toe-plate shelf upon movement of the movable shelf on the rolling base to assume the lowered position to establish a rigidified shelf made of the mating movable and toe-plate shelves.

3. The hand truck of claim 1, wherein the shelf position changer further includes anchor means coupled to the shelf mover for engaging more than one of the rungs included in the truck frame to establish an elevation of the movable shelf above the toe-plate shelf underlying the movable shelf.

4. The hand truck of claim 3, wherein the anchor means is coupled to the crossbar to move therewith during movement of the shelf mover relative to the truck frame.

5. The hand truck of claim 3, wherein the anchor means includes a first anchor coupled to the cross bar of the shelf mover and arranged to lie in spaced-apart relation to the first side rail of the shelf mover to define a rail-receiving space therebetween receiving the first guide rail of the rolling base therein during up-and-down movement of the shelf mover on the rolling base.

6. The hand truck of claim 1, wherein the rolling base is formed to include first and second guide surfaces arranged to lie in spaced-apart relation to one another to define an outer channel therebetween and the shelf mover includes a first side leg arranged to extend along the outer channel and guide means coupled to the first side leg and arranged to extend into the outer channel for engaging the first and second guide surfaces during up-and-down movement of the shelf mover on the rolling base to support the shelf position changer for sliding and pivoting motion relative to the rolling base as the elevation of the movable shelf relative to the toe-plate shelf is changed.

7. The hand truck of claim 6, wherein the guide means includes a lower guide block coupled to a lowermost end of the first side leg, an upper guide block coupled to a middle portion of the first side leg, and a middle pivot block coupled to the first side leg and located midway between the upper and lower guide blocks.

8. The hand truck of claim 7, wherein the shelf mover further includes a handle coupled to an upper portion of the first side leg arranged to extend upwardly from the upper guide block in a direction away from the lower guide block and the shelf position changer further includes an anchor coupled to the handle and arranged to mate with the rolling base to fix a position of the movable shelf relative to the toe-plate shelf and to separate from the rolling base during upward movement of the handle away from the toe-plate shelf and pivoting movement of the handle about a fulcrum established by engagement of the middle pivot block and the second guide surface to allow movement of the movable shelf relative to the toe-plate shelf to assume a new elevation.

9. The hand truck of claim 7, wherein the lower guide block is located along a rear edge of the first side leg to mate in sliding engagement with the first guide surface of the rolling base during up-and-down movement of the shelf mover relative to the rolling base and the upper guide block is located along an opposite front edge of the first side leg to mate in sliding engagement with the second guide surface of the rolling base during up-and-down movement of the shelf mover relative to the rolling base.

10. The hand truck of claim 9, wherein the upper guide block is moved in the outer channel to mate with the second guide surface and the lower guide block is moved in the outer channel to mate with the first guide surface in response to pivoting movement of the shelf position changer about a fulcrum established by engagement of the middle pivot block with the second guide surface.

11. The hand truck of claim 6, wherein the rolling base includes a first upright rail formed to include the first and second guide surfaces and the outer channel and the first side leg is arranged to move along the first upright rail during up-and-down movement of the shelf position changer on the rolling base.

12. A hand truck comprising
a rolling base,
a toe-plate shelf coupled to the rolling base,
an auxiliary carrier including a movable shelf arranged to lie above the toe-plate shelf and a shelf position changer means for changing the position of the movable shelf on the rolling base relative to the toe-plate shelf underlying the movable shelf to vary the elevation of the movable shelf above the toe-plate shelf, and
wherein the rolling base includes a series of vertically spaced-apart rungs and the shelf position changer further includes anchor means for engaging more than one of the rungs to establish an elevation of the movable shelf above the toe-plate shelf underlying the movable shelf.

13. The hand truck of claim 12, wherein the shelf position changer further includes a shelf mover mounted on the rolling base for up-and-down movement relative to the rungs and arranged to interconnect the movable shelf and the anchor means, the shelf mover includes a handle adapted to be gripped by a user to control the location of the shelf mover relative to the rungs, and the anchor means is coupled to the handle.

14. The hand truck of claim 12, wherein the anchor means includes a hook configured to mate with each of the rungs.

15. A hand truck comprising
a rolling base,
a toe-plate shelf coupled to the rolling base,
an auxiliary carrier mounted on the rolling base for movement relative to the toe-plate shelf, wherein the auxiliary carrier includes a movable shelf, a shelf mover, and an anchor coupled to the shelf mover, the movable shelf is coupled to the shelf mover to move up and down with the shelf mover on the rolling base and relative to the toe-plate shelf underlying the movable shelf, and the anchor is configured to mate with the rolling base to limit the movement of the shelf mover and the movable base relative to the rolling base and to separate from the rolling base in response to movement of the shelf mover away from the toe-plate shelf to change the position of the movable shelf on the rolling base so as to vary the elevation of the movable shelf relative to the toe-plate shelf underlying the movable shelf and wherein the rolling base includes a truck frame and a wheel unit coupled to the truck frame, the truck frame includes first and second upright rails arranged to lie in spaced-apart relation to one another and rungs arranged to interconnect the first and second upright rails, and the shelf mover includes a first side leg mounted for sliding movement on the first upright rail, a second side leg mounted for sliding movement on the second upright rail, and a crossbar interconnecting the first and second side legs, and the movable shelf is coupled to the first and second side legs to move therewith.

16. The hand truck of claim 15, wherein the movable shelf is arranged to mate with the toe-plate shelf upon movement of the movable shelf on the rolling base to assume a lowered position to establish a rigidified shelf made of the mating movable and toe-plate shelves.

17. A hand truck comprising a rolling base, a toe-plate shelf coupled to the rolling base, and an auxiliary carrier including a movable shelf arranged to lie above the toe-plate shelf and a shelf position changer means for changing the position of the movable shelf on the rolling base relative to the toe-plate shelf underlying the movable shelf to vary the elevation of the movable shelf above the toe-plate shelf, wherein the shelf position changer includes a shelf mover mounted for up-and-down movement on the rolling base and the movable shelf is coupled to the shelf mover to move therewith between a lowered position near the toe-plate shelf and a raised position elevated above the toe-plate shelf, wherein the rolling base includes a truck frame and a wheel unit coupled to the truck frame, the truck frame includes first and second upright rails arranged to lie in spaced-apart relation to one another and rungs arranged to interconnect the first and second upright rails, and the shelf mover includes a first side leg mounted for sliding movement on the first upright rail, a second side leg mounted for sliding movement on the second upright rail, and a crossbar interconnecting the first and second side legs, and the movable shelf is coupled to the first and second side legs to move therewith, and wherein the shelf position changer further includes anchor means coupled to the shelf mover for engaging more than one of the rungs included in the truck frame to establish an elevation of the movable shelf above the toe-plate shelf underlying the movable shelf.

18. A hand truck comprising a rolling base, a toe-plate shelf coupled to the rolling base, and an auxiliary carrier including a movable shelf arranged to lie above the toe-plate shelf and a shelf position changer means for changing the position of the movable shelf on the rolling base relative to the toe-plate shelf underlying the movable shelf to vary the elevation of the movable shelf above the toe-plate shelf, wherein the shelf position changer includes a shelf mover mounted for up-and-down movement on the rolling base and the movable shelf is coupled to the shelf mover to move therewith between a lowered position near the toe-plate shelf and a raised position elevated above the toe-plate shelf, wherein the rolling base is formed to include first and second guide surfaces arranged to lie in spaced-apart relation to one another to define an outer channel therebetween and the shelf mover includes a first side leg arranged to extend along the outer channel and guide means coupled to the first side leg and arranged to extend into the outer channel for engaging the first and second guide surfaces during up-and-down movement of the shelf mover on the rolling base to support the shelf position changer for sliding and pivoting motion relative to the rolling base as the elevation of the movable shelf relative to the toe-plate shelf is changed, and wherein the guide means includes a lower guide block coupled to a lowermost end of the first side leg, an upper guide block coupled to a middle portion of the first side leg, and a middle pivot block coupled to the first side leg and located midway between the upper and lower guide blocks.

* * * * *